United States Patent [19]

Toyota et al.

[11] Patent Number: 4,778,689
[45] Date of Patent: Oct. 18, 1988

[54] PROCESS FOR PRODUCING PACKAGED FISH OR MEAT PASTE PRODUCTS

[75] Inventors: Takeshi Toyota, Kyoto; Hiroshi Kasai, Kawabe; Koichi Kotani, Sakai, all of Japan

[73] Assignee: Takeda Chemical Industries, Ltd., Osaka, Japan

[21] Appl. No.: 856,020

[22] Filed: Apr. 25, 1986

[30] Foreign Application Priority Data

Apr. 29, 1985 [JP] Japan ................................. 60-91896

[51] Int. Cl.$^4$ ........................ A23B 4/10; A23L 1/229
[52] U.S. Cl. ................................... 426/537; 426/646; 426/643; 426/302
[58] Field of Search ............... 426/643, 332, 537, 646, 426/302, 650

[56] References Cited

U.S. PATENT DOCUMENTS

| | | | |
|---|---|---|---|
| 3,466,175 | 9/1969 | Takemoto | 426/537 |
| 3,524,747 | 8/1970 | O'Hara et al. | 426/537 |
| 3,578,465 | 5/1971 | Zijder | 426/537 |
| 4,376,132 | 3/1983 | Eguchi et al. | 426/537 |
| 4,423,083 | 12/1983 | Shenouda | 426/574 |
| 4,472,447 | 9/1984 | Mizutani et al. | 426/537 |

FOREIGN PATENT DOCUMENTS

| | | |
|---|---|---|
| 1450072 | 7/1966 | France . |
| 340 | 1/1966 | Japan . |
| 1470 | 1/1967 | Japan . |
| 8692 | 4/1968 | Japan . |
| 16948 | 5/1971 | Japan . |
| 10228 | 4/1973 | Japan . |
| 55-28677 | 7/1980 | Japan .................................. 426/302 |

OTHER PUBLICATIONS

Patent Abstracts of Japan, vol. 6, No. 78, (C-102)[956], May 15, 1982.

*Primary Examiner*—Donald E. Czaja
*Assistant Examiner*—Mary S. Mims
*Attorney, Agent, or Firm*—Wenderoth, Lind & Ponack

[57] ABSTRACT

In production of packaged fish or meat paste products, a seasoning process using a liquid containing water-soluble 5'-ribonucleotide is conducted between cooking and packaging. The products thus obtained have an eminently favorable taste due to taste-improving 5'-ribonucleotide, and can be stored with said 5'-ribonucleotide kept in a stable condition.

7 Claims, No Drawings

PROCESS FOR PRODUCING PACKAGED FISH OR MEAT PASTE PRODUCTS

The present invention relates to a production method for fish or meat paste products seasoned suitably with 5′-ribonucleotide.

In producing paste products such as meat sausage, fish sausage and cooked fish pastes (kamaboko, chikuwa, etc.), it is difficult to improve taste sufficiently even if 5′-ribonucleotide, like other seasonings, is added directly to the material during the seasoning/kneading process, since 5′-ribonucleotide is decomposed during the smoking, drying or gel setting process by phosphatase derived from the fish or meat material. Some ways are known of preventing this. For example, 5′-ribonucleotide coated with a film-forming agent which is a solid at ordinary temperature, and which is broken not by water but by heat (Japanese Patent Publication No. 1470/1967), or 5′-ribonucleotide coated with Tween or polyvinyl butyral (Japanese Patent Publication No. 8692/1968). These are added to the material fish or meat during the grinding process; dehydro-ascorbic acid or penicillamine esters are also added to inhibit phosphatase action (Japanese Patent Publication No. 16948/1971, Japanese Patent Publication No. 10228/1973); the food material is stuffed into the package into which 5′-ribonucleotide has been adhered and then is subjected to heat treatment (Japanese Patent Publication No. 340/1966).

As stated above, some methods of preventing 5′-ribonucleotide decomposition due to phosphatase are known in the production of fish or meat paste products. These methods, however, cannot always be regarded as convenient, as they require coated 5′-ribonucleotide or a phosphatase activity inhibitor.

The purpose of the present invention is to provide a more industrially favorable method of producing paste products containing 5′-ribonucleotide in a stable state, without incurring any major changes in conventional production processes.

The inventors made many studies on the problems discussed above, resulting in the development of the present invention. The present invention is a production method for packaged fish or meat paste products, characterized in that a seasoning process using a liquid containing water-soluble 5′-ribonucleotide is added between the cooking and packaging processes in fish or meat paste production.

In the present invention, the following products are defined as fish or meat paste products: meat paste products, e.g. sausage, ham, meat patty, hamburger patty and meat loaf; fish paste products which includes a variety of products prepared from surimi, which is a Japanese term for mechanically deboned fish flesh that has been washed with water and mixed with cryoprotectanats (e.g. sugar, sorbitol, polyphosphates) for a good frozen shelf life. There may be mentioned kamaboko, chikuwa, crab leg kamaboko (texturized shellfish meat analogs), hanpen, fried kamaboko, fish ham and fish sausage; and sausage made from a fish/meat mixture. This invention can be favorably applied especially in the production of paste products with a greater surface area per unit weight, e.g. Vienna sausage, crab leg kamaboko, chikuwa, sliced sausage and sliced ham.

Fish or meat paste products are usually produced via the following main processes.

For example, although there are some differences according to product types, meat paste products, such as meat sausage, are produced as follows: the material meat, after sorting, is subjected to (1) curing, (2) mincing, (3) seasoning/kneading, (4) stuffing into a casing, (5) drying/smoking, (6) cooking (boiling, simmering or steaming), (7) cooling, and (8) packaging, in that order.

Fish paste products, such as kamaboko and chikuwa, are usually produced via the following main process: kneaded fish (frozen or unfrozen surimi) as a material, after rinsing in running water, is subjected to (1) salting, (2) seasoning/chopping, (3) shaping or casing, (4) gel setting ("suwari" in Japanese term), (5) cooking (boiling, simmering, steaming, baking, frying), (6) cooling, and (7) packaging, in that order.

The cooling process defined in the present invention indicates drying/smoking and boiling, simmering or steaming for meat products, and boiling, simmering, steaming, baking, or frying for fish products. This invention requires no special change insofar as these processes are applied in usual ways. In meat paste production, for example, drying/smoking is performed at approx. 35°–85° C. for 30 minutes to 5 hours, or heating by boiling or steaming is done at approx. 70°–85° C. for 15 minutes to 1.5 hours (cooking conditions vary greatly according to product type and size).

Cooking conditions also differ according to product types in fish paste production; for example, steaming at approx. 75°–95° C. for 30 minutes to 1 hour is required to produce kamaboko, while boiling at approx. 80°–85° C. for 2 to 5 minutes is performed to make hanpen. For fried kamaboko, deep fat frying at 160°–200° C. for 2 to 5 minutes is required. As states above, final cooking conditions differ between meat and fish paste products; however, phosphatase is inactivated at a temperature of 60°–65° C. or more in both cases.

In the present invention, a shaped material in which phosphatase has been substantially inactivated via the cooking process is surface-seasoned with a liquid containing water-soluble 5′-ribonucleotide prior to packaging. The seasoning liquid, used as an aqueous solution or an emulsion, is applied by the following methods: (a) dipping method; a cooked shaped material is dipped in the said seasoning liquid, (b) spraying method; the said seasoning liquid is sprayed over the surface of a cooked shaped material, or (c) otherwise applying the said seasoning liquid, for example by brushing or pouring, to the surface of a cooked shaped material. On the basis of product type and size and production equipment type, an appropriate method can be chosen; these methods may also be used in combination. A dipping method is more preferable in that the 5′-ribonucleotide can be permeated uniformly into a cooked shaped material.

The following water-soluble 5′-ribonucleotides can be used in said seasoning liquid preparation: 5′-inosinic acid, 5′-guanylic acid, their edible salts (sodium salt, potassium salt, ammonium salt, lysine salt, histidine salt, arginine salt, etc.), and their mixtures [sodium 5′-ribonucleotide (mixture of sodium 5′-inosinate and sodium 5′-guanylate)]. In addition to these taste-improving 5′-ribonucleotides, 5′-adenylic acid, 5′-uridylic acid, 5′-cytidylic acid and their edible salts may also be used.

The concentration of taste-improving water-soluble 5′-ribonucleotide in the seasoning liquid should be approx. 0.01–10% by weight, for example approx. 0.05–10% by weight, preferably approx. 0.1–10% by weight, more preferably approx. 0.1–3% by weight. To improve its spreadability and adhesion on a cooked shaped material, the following substances can be added: thickeners, e.g. guar gum, locust bean gum, tara gum, xanthane gum, pectin, and carboxymethyl cellulose.alginate; emulsifiers, e.g. glycerol ester of fatty acid, sucrose ester of fatty acid, sorbitan ester of fatty acid, soybean phospholipid, and propylene glycol ester of fatty acid; saccharides, e.g. glucose, sucrose, dextrin, and starch; and fats and oils. In addition, chemical seasonings (sodium glutamate, disodium succinate, etc.), natural seasonings [plant and animal extracts, HAP (hydrolyzed animal protein), HPP (hydrolyzed plant protein), yeast extract, mirin (a sweet sort of sake), wine, etc.] and spices can be added to improve taste.

If surface dyeing is required, coloring agents (Food red No. 3 (erythrosine), water-soluble annatto, red koji pigment, kaoliang pigment, cacao pigment, etc.) can be added; if surface antiseptic treatment is required before packaging, a proper quantity of alcohols, preservatives (sorbic acid, etc.) or edible organic acids (lactic acid, fumaric acid, malic acid, etc.) may also be added.

Seasoning liquid pH can lie within a range of approx. 2.5–10; for example, the recommended pH range is approx. 2.5–6 in the case of surface antiseptic treatment, approx. 7–10 in the case of dyeing by using anatto color. Especially, when the seasoning is carried out by using the liquid of approx. pH 2.5 to 4.8, the 5'-ribonucleotide can be permeated deeper and more uniformly in a short treating time even if the 5'-ribonucleotide is used in such low concentration as approx. 0.05 to 1% by weight.

In applying the seasoning process described in this invention to products having no casing, such as boarded kamaboko and chikuwa, and to those having a smoke-permeable casing (sheep's gut and other natural guts, collagen casing, or others), such as Vienna sausage, seasoning can be applied directly on the surface, as in the method shown above. Products having a non-smoke permeable casing, such as retainer kamaboko, cased kamaboko and cellophane cased Vienna sausage, are subjected to seasoning after the casing is removed.

As stated previously, seasoning is performed by dipping, spraying, or other methods; treating time can be arbitrarily varied according to the type, shape and size of paste products to be treated. For example, when the dipping method is used, recommended treating time is usually approx. 0.5–10 minutes, preferably approx. 0.5–5 minutes, allowing 5'-ribonucleotide to permeate deeper while leaving texture and other qualities relatively unaffected. Especially, in the case that the seasoning liquid adjusted to a pH of 2.5 to 4.8 is used, the dipping may be carried out in a short time such as approx. 0.5–1 minute. Treating temperature at the time of seasoning involves using a relatively higher temperature, i.e. approx. 65°–80° C., for a short time, though temperature is not limited to a given range. When the seasoning process described in this invention is also applied in cooling after the cooking process, treating temperature can be lowered to approx. −1° to 10° C.

In the process of the present invention, the tasty 5'-ribonucleotide is incorporated in or on a cooked shaped product in an addition amount of approx. 20–100 mg% based on the finished product. The unit "mg%" represents mg of 5'-ribonucleotide per 100 g of the product.

The seasoned material, after being cooled and dried (if required), is subjected to packaging.

In the packaging process it is important to keep the 5'-ribonucleotide used in the surface seasoning process in a stable condition. Various packaging styles can be used, e.g. vacuum packaging, blister packaging such as deep-drawing packaging, skin packaging, pillow packaging, and gas packaging. Materials used in these packaging styles include plastic films of nylon, polyester, vinylidene chloride, etc., multilayer films of these plastic films in combination, and laminate films of cellophane, aluminum foil, etc. Packaging using these films should be done immediately after the seasoning process, and under aseptic conditions whenever possible.

Fish and meat paste products obtained by the production method in this invention have an eminently favorable taste due to taste-improving 5'-ribonucleotide, and can be stored with the said 5'-ribonucleotide kept in a stable condition. In addition, this method can be applied easily; it is industrially far superior to conventional methods in which 5'-ribonucleotide is coated or phosphatase inhibitors are used.

EXPERIMENT 1

Using pork, lard, horseflesh, and frozen ground flesh of cod as materials in a conventional method, Vienna sausage was prepared via a simmering process at 80° C. for 40 minutes.

Ten grams of Ribotide (a mixture of sodium 5'-inosinate and sodium 5'-guanylate, from Takeda Chemical Industries Co.), 10 ml of San Annatto W (annatto color, Sanei Chemical Co.), and 10 g of Polyrinsan "Takeda" 5-C (Takeda Chemical Industries Co.), were dissolved in 1,000 ml of water, yielding a seasoning liquid (pH 9.8). Three hundred grams of the sausage were dipped in the seasoning liquid at 80° C. for the times specified in Table 1. Two minutes later, aliquots of the treated sausage were (A) cooled and dried via cool air blowing at 5° C., or (B) dipped in cool water at 40° C. for 1 minute and then cooled and dried via cool air blowing at 5° C. Each resulting product was immediately packaged in a plastic bag and kept at 5° C. in a refrigerator for one night. Each product was then investigated to determine sodium 5'-ribonucleotide content and a sensory evaluation of its taste was evaluated by a panel of trained members.

The following result was found: even when a product was subjected to water cooling following one minute of dipping treatment, sodium 5'-ribonucleotide permeated well into the Vienna sausage, resulting in taste improvement over untreated products.

TABLE 1

| Dipping Time | Sodium 5'-ribonucleotide (mg %) | | Degree of Taste |
|---|---|---|---|
| | A (Air cooling) | B (Water cooling) | |
| Untreated | 0 | 0 | ± |
| 1 min. | 23.7 | 14.8 | + |
| 2 min. | 28.1 | 23.6 | ++ |
| 3 min. | 34.3 | 33.8 | +++ |
| 4 min. | 36.5 | 35.9 | +++ |
| 5 min. | 42.8 | 41.9 | +++ |

±: Not strong
+: Slightly strong
++: Strong
+++: Considerably strong

EXAMPLE 1

Using mutton, horseflesh, pork, lard, chicken and frozen ground flesh of cod as materials and cellophane film (diameter: 1.5 cm) as casing, sausage was prepared by a conventional method; cooking was done by simmering at 80° C. for 40 minutes, and cellophane casings were removed after cooling.

Separately, 10 g of Ribotide and 6.7 g of Sorbiron KP-2 (A composition containing 14.995% of sorbic acid, 55% of fumaric acid, 7% of disodium dihydrogen pyrophosphate and 0.005% of sucrose fatty acid ester, Takeda Chemical Industries Co., Japan) were dissolved in 1,000 ml of water, yielding a seasoning liquid (pH 3.5). Three hundred grams of the sausage were dipped in the 80° C. seasoning liquid for 1 minute, and then cooled and dried in a refrigerator. Sixty gram portions of the dried product were separately packaged in plastic bags and stored at 5° C. for 1 month with sodium 5'-ribonucleotide determination performed weekly.

The result, as shown in Table 2, shows that sodium 5'-ribonucleotide content did not change during storage.

TABLE 2

| Storage Period | Sodium 5'-ribonucleotide (mg %) |
|---|---|
| Untreated | 0 |
| Immediately after storage | 50.4 |
| 1 week | 50.0 |
| 2 weeks | 50.2 |
| 3 weeks | 50.8 |
| 4 weeks | 50.2 |

EXAMPLE 2

Using mutton, horseflesh, pork, lard, chicken and frozen ground flesh of cod as materials and cellophane film (diameter: 1.5 cm) as casing, sausage was prepared by a standard method; cellophane casings were removed after cooling with running water, following 80° C. heating for 40 minutes.

After being dipped in 1 liter (pH 7.2) of a 2% Ribotide solution at 80° C. for 1 minute, 300 g portions of the sausage were cooled and dried in a refrigerator, yielding a total of 900 g of seasoned sausage. Ninety gram portions of this seasoned Vienna sausage were placed in individual polystyrene trays, half of which were covered with a vinylidene chloride film, and stored at 5° C. for 4 weeks. During storage, sodium 5'-ribonucleotide determination was performed weekly.

In cases of packaged products, few changes were seen in sodium 5'-ribonucleotide content even after 4 weeks. In unpackaged products, however, approx. 75% of the initial sodium 5'-ribonucleotide content decomposed in a week, with little remaining by the 2nd week.

Sodium 5'-ribonucleotide determination data is shown in Table 3.

TABLE 3

| | | | | | (mg %) |
|---|---|---|---|---|---|
| | | Storage period | | | |
| Sample | Immediately after preparation | 1 week | 2 weeks | 3 weeks | 4 weeks |
| Packaged Products | 48.6 | 48.0 | 47.8 | 47.3 | 47.0 |
| Unpackaged Products | 48.6 | 13.3 | 3.2 | 0 | 0 |

EXAMPLE 3

Sausage was prepared by the method shown in Example 1, and its cellophane casings were removed. Five kilograms of this sausage were then put into a coating pan (NO-16-D model, Kikusui Co., Japan). After being sprayed with 400 ml of a 0.25% Ribotide solution (pH 6.8), the sausage was dried by hot air blowing at 80° C. for 5 minutes. The dried sausage was enclosed in a polycellophane bag immediately after cooling, and then stored in a refrigerator for 5 days. Sodium 5'-ribonucleotide determination and sensory evaluation of taste were then carried out.

Sodium 5'-ribonucleotide content in the sausage was 18.3 mg%. Compared to the untreated product, the product sprayed with Ribotide solution had a clearly stronger taste, i.e. a favorable taste-improving quality was found.

EXAMPLE 4

Using frozen ground flesh (surimi) of cod as a material, crab leg kamaboko was prepared by a standard method of steaming at 80° C. for 30 minutes.

Five kilograms of the resulting crab leg kamaboko was sprayed with 400 ml (pH 2.6) of a 60° C. solution containing 0.5% Ribotide, 2% lactic acid and 2.5% reduced-maltose syrup (Malty Towa, Towa Kasei Kogyo Co., Japan). After the sprayed solution was rinsed away, the treated kamaboko was stored at 5° C. in a tray covered with a polyvinylidene chloride film. As a control test, the crab leg kamaboko was sprayed with a liquid identical to the sprayed solution except that one component, i.e. Ribotide, was excluded.

These products, after being stored at 5° C. for 1 week, were subjected to a sensory evaluation test; the product treated with the spray liquid containing Ribotide clearly had a stronger taste and was less sour than the control product.

EXAMPLE 5

Using frozen ground flesh (surimi) of cod as a material, chikuwa was prepared by a standard method.

An emulsion composed of 2 parts Ribotide, 0.1 part xanthane gum, 0.5 part of sucrose ester of fatty acid (HLB 7.0), 50 parts water, and 50 parts salad oil (by weight), pH 7.2, was applied to just-baked chikuwa in a ratio of 2-3 ml per 100 g chikuwa, after which the chikuwa was cooled and dried at room temperature. A set of 3 chikuwa, after being packaged in individual polycellophane bags, was stored at 5° C. for 3 days and then subjected to a sensory evaluation test.

As a control product, chikuwa treated with an emulsion identical to the treating liquid shown above except for the lack of one component, i.e. Ribotide, was used. The strength and preferability of taste was evaluated by a panel of 20 members, all of whom judged the sample treated with the emulsion containing Ribotide to have a stronger taste than the control sample, with 17 of them preferring it.

EXAMPLE 6

Using pork, beef and lard as materials and collagen film (diameter: 1.5 cm) as casing, Vienna sausage was prepared by a conventional method; drying was done by heating at 70° C. for 30 minutes, and after smoking at 70° C. for 15 minutes, the sausage was simmered at 80° C. for 20 minutes.

Separately, 0.2 kg of Ribotide and 10 kg of the lactic agent "ML-10" (lactic acid 30%, Takeda Chemical Industries Co.) were dissolved in 90 kg of water, yielding a seasoning liquid (pH 2.6). Eight kilograms of the sausage were dipped in the 40°, 60° or 80° C. seasoning liquid for 1 minute, and then cooled and dried in a refrigerator.

On the other hand, eight kilograms of the sausage were dipped in the 40°, 60° or 80° C. seasoning liquid (pH 7.5), which was prepared by dissolving 0.2 kg of Ribotide in 10 kg of water, for 1 minute, and then cooled and dried in a refrigerator. Further, eight kilograms of the sausage were dipped in the 40°, 60° or 80° C. seasoning liquid (pH 9.8), which was prepared by dissolving 0.2 kg of Ribotide, 200 ml of San Anatto (W) and 0.2 kg of Polyrinsan "Takeda" 5-C [sodium pyrophosphate (anhydrous), Takeda Chemical Industries Co.] in 10 kg of water, for 1 minute, and then cooled and dried in a refrigerator.

Each product was then investigated to determine sodium 5'-ribonucleotide content. The results are shown in Table 4.

TABLE 4

| Temperature of Seasoning Liquid (°C.) | pH of Seasoning Liquid (mg %) | | |
|---|---|---|---|
| | pH 2.6 | pH 7.5 | pH 9.8 |
| 20 | 18.7 | 10.2 | 6.7 |
| 40 | 22.3 | 15.4 | 11.2 |
| 60 | 27.1 | 21.0 | 17.8 |
| 80 | 31.2 | 26.7 | 22.6 |

As is shown in Table 4, the seasoning process can be more advantageously carried out in the condition of lower pH and higher temperature.

What we claim is:

1. A process for producing a packaged fish or meat paste product, which comprises adding to a shaped material of fish or meat paste a seasoning liquid containing water-soluble 5'-ribonucleotide and having a pH of 2.5 to 4.8 after cooking the shaped material and before packaging the shaped material.

2. The process according to claim 1, wherein the seasoning liquid is added by dipping a cooked shaped material of fish or meat paste in a liquid containing water-soluble 5'-ribonucleotide.

3. The process according to claim 2, wherein the dipping time is about 0.5 to 1 minute.

4. The process according to claim 2, wherein the concentration of the liquid containing water-soluble 5'-ribonucleotide is about 0.1 to 1%.

5. The process according to claim 2, wherein the temperature of the liquid containing water-soluble 5'-ribonucleotide is about 65° to 80° C.

6. The process according to claim 1, wherein the product is sausage, kamaboko or chikuwa.

7. The process according to claim 1, wherein the 5'-ribonucleotide is a mixture of sodium 5'-inosinate and sodium 5'-guanylate.

* * * * *